United States Patent [19]

Smith

[11] E Re. 31,212

[45] Reissued Apr. 19, 1983

[54] VEHICLE SUSPENSION DEVICE

[75] Inventor: Charles J. Smith, Fairview, Mich.

[73] Assignee: Monroe Auto Equipment Company, Monroe, Mich.

[21] Appl. No.: 944,544

[22] Filed: Sep. 21, 1978

Related U.S. Patent Documents

Reissue of:

[64] Patent No.: 3,346,272
Issued: Oct. 10, 1967
Appl. No.: 496,045
Filed: Oct. 14, 1965

U.S. Applications:

[63] Continuation of Ser. No. 735,809, Oct. 26, 1976, abandoned.

[51] Int. Cl.[3] ..... B60G 11/14

[52] U.S. Cl. ..... 280/668

[58] Field of Search ..... 280/660, 666–668, 280/670, 672, 674, 693, 696; 267/8 R, 34, 6.4 R; 188/321

[56] References Cited

U.S. PATENT DOCUMENTS

| | | | |
|---|---|---|---|
| 2,567,144 | 9/1951 | Butterfield | 280/670 |
| 2,624,592 | 1/1953 | MacPherson | 280/668 |
| 2,935,334 | 5/1960 | Felts | 280/666 |
| 2,992,013 | 7/1961 | Seigler | 280/670 |
| 3,156,481 | 11/1964 | Dangauthier | 280/668 |

FOREIGN PATENT DOCUMENTS

| | | | |
|---|---|---|---|
| 595193 | 6/1959 | Italy | 280/668 |
| 1031650 | 6/1966 | United Kingdom . | |

*Primary Examiner*—Robert R. Song
*Attorney, Agent, or Firm*—Harness, Dickey & Pierce

[57] ABSTRACT

A vehicle coil spring and shock absorber connected directly to the front wheel by a mounting tube having a removable bottom through which the shock absorber may be removed.

38 Claims, 4 Drawing Figures

49
48
47
35
33
45
37
57
27
41
55
57
43
51
31
30
53
29
40
25
39
150
152
61
77
148
75
79
83
11
81
84
146
26
143
15
145
2
4
4
85
88
28
87
89
13
21
19
65
16
67
3
23
73
69
24
18
71
17
14
12
101
105
106
15
99
97
103
95
85
91
93
108
109
88
107
67
111
113
115
89
87

67
131
133
121
127
125
129
73
123
134
117
119
135
141
139
137

67
101
16
65
106
15

VEHICLE SUSPENSION DEVICE

Matter enclosed in heavy brackets [ ] appears in the original patent but forms no part of this reissue specification; matter printed in italics indicates the additions made by reissue.

*This application is a continuation of U.S. application Ser. No. 5,735,809 filed Oct. 26, 1976, now abandoned, which is a Reissue application of Ser. No. 5,496,045 filed Oct. 14, 1965, Pat. No. 3,346,272.*

This invention relates generally to motor vehicles, and particularly to an improved suspension device flexibly supporting the vehicle chassis upon ground contacting wheels.

In some motor vehicle suspension systems, it is desirable to locate the suspension devices which together make up the front suspension system and which devices each include a coil spring and shock absorber, directly at each vehicle front wheel. One such suspension system is illustrated and described in the U.S. Pat. No. 2,624,592 to MacPherson and is referred to in the trade as the MacPherson system.

One of the undesirable aspects of this type of suspension system, has been that in the past it has been necessary to dismantle a major portion of the vehicle front end, including each wheel and wheel spindle when removing and replacing the shock absorbers after their parts become worn. This is a costly, difficult and time consuming process and requires special tools and skills. Therefore, a suspension device incorporating the desirable features of the MacPherson system but which eliminates the complex dismantling and replacement aspects for the shock absorber would be highly desirable.

Main obects of the present invention are an improved vehicle suspension device including a coil spring and shock absorber which supports the vehicle chassis directly at each wheel and which permits the shock absorber to be removed and replaced in installation *as a cartridge unit* with a minimum of difficulty and without disturbing or dismantling other vehicle components.

Further objects include an improved suspension device of the above character which is relatively inexpensive to manufacture, rugged in construction and reliable in use.

Other objects and advantages of the present invention will become more apparent from a consideration of the following detailed description taken in conjunction with the drawings in which.

Figures 1, 2, 3, 4:
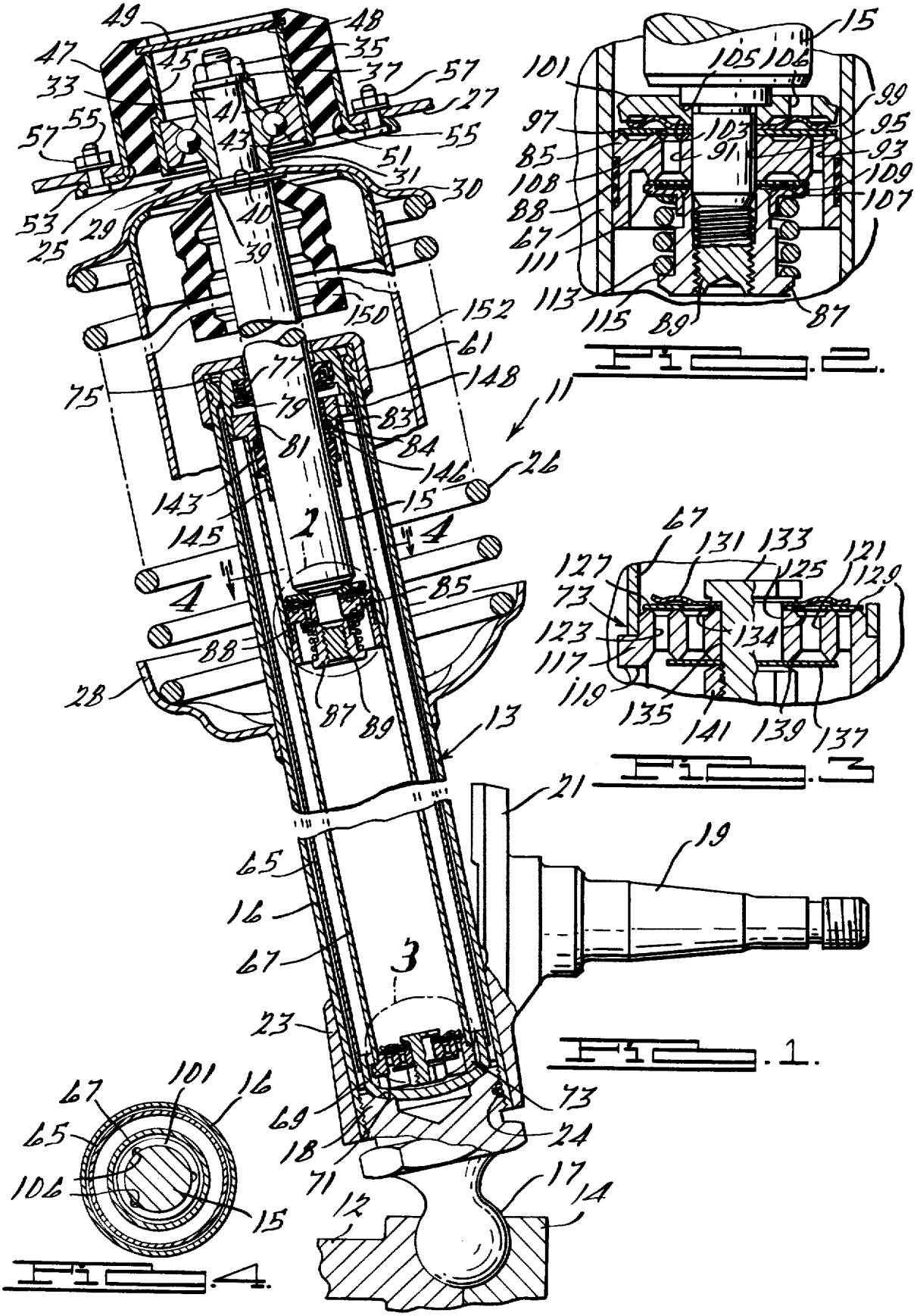
FIG. 1 is a sectional view of a suspension device embodying the present invention.
FIG. 2 is an enlarged view of a portion of the structure of FIG. 1 taken within the circle 2.
FIG. 3 is an enlarged view of a portion of the structure of FIG. 1 taken within the enclosure 3.
FIG. 4 is a sectional view of FIG. 1 taken along the line 4—4 thereof.

Broadly described, the present invention includes an automotive vehicle suspension device having a telescopic type, shock absorber and a surrounding coil spring wherein the shock absorber has one end detachably connectable to the vehicle body or frame and the other end removably supported within a tube connectable to the vehicle wheel spindle so that the shock absorber is removable *as a cartridge unit* upon detaching from the vehicle body or frame without disturbing the wheel or wheel spindle.

Referring now more specifically to the drawings and particularly FIG. 1, a suspension device embodying the present invention is illustrated generally at 11 and is seen to include a cylinder assembly 13 comprising a plurality of concentric tubes in which a piston rod 15 is slidably disposed in telescopic fashion, the cylinder assembly 13 and piston rod together forming a vehicle shock absorber. The cylinder assembly 13 is removably supported in a tube 16 secured at its lower end to a wishbone suspension member 12 through a ball 17 universally received in a detachable socket 14, the ball 17 having an integral threaded upper end 18 threadedly received in the tube 16. A wheel spindle 19 upon which the vehicle wheel (not shown) is mounted has a sleeve 23 encompassing and secured to the lower end of the tube 16. A removable locking pin 24 extends through aligned openings in the tube 16, the threaded end 18 and the sleeve 23 to prevent the ball 17 from the inadvertently detaching from the tube 16 during use.

The piston rod 15 extends upwardly through an opening 25 in the body or frame of the vehicle, a portion of which is shown at 27. A ball bearing 29 has an elongated inner race 31 held on a reduced end 33 of the piston rod 15 by a nut 35 and washer 37. The lower end of the bearing inner race 31 engages a washer 39 seated against a shoulder 40 on the piston rod 15. The outer race 41 of the bearing 29 is seated in an enlarged end 43 of a tubular member 45 secured in sleeve 47 which may be constructed of flexible rubber or rubber-like material. The enlarged end 43 of the tubular member 45 is crimped below the outer bearing race 41 to hold the bearing 29 in place. A disc 49 is removably positioned in a groove 48 in the upper end of the sleeve 47 to keep dirt, grease and other foreign matter from accumulating above and contaminating the bearing 29. The sleeve 47 is secured to the vehicle body 27 by an annular collar 51 surrounding and secured to the sleeve 47 and formed with an integral radially outwardly extending flange 53 overlying the vehicle body 27 and secured thereto by bolts 55 and nuts 57.

In use, the shock absorber piston rod 15 moves with the vehicle body or frame 27 and slides telescopically within the cylinder assembly 13, the flexible sleeve 47 allowing angular displacement between the piston rod 15 and the body or frame 27 and the ball bearing 29 allowing the piston rod to turn therewithin. The tube 16 which houses the cylinder assembly 13 is supported upon the wishbone suspension number 12 through the ball 17 and turns with the wheel (not shown) and the spindle 19 substantially about the longitudinal central axis of the tube 16 and cylinder assembly 13.

The vehicle chassis weight is supported by the wheels and is suspended at each wheel by a coil spring 26 sleeved over the tube 16. The lower end of the spring 26 is seated in an annular spring support 28 welded or otherwise secured to the tube 16 and the spring upper end is seated in a hat-shaped annular support 30 seated between the bearing inner race 31 and the washer 39. Thus, when the vehicle body or frame 27 moves downwardly relative to the wheels (not shown), the piston rod 15 moves downwardly within the cylinder assembly 13 and the spring 26 is compressed. Upward movement of the vehicle body or frame 27, of course, causes upward movement of the piston rod 15 and allows the spring 26 to expand.

To cushion and dampen this relative movement between the vehicle body and frame 27 and the wheels and creating the desired shock-absorbing characteristics, the piston rod 15 and cylinder assembly 13 are provided with valve means shown in FIG. 1 and in greater detail in FIGS. 2 and 3. Thus, the cylinder assembly 13 includes an outer or reserve tube 65 having its lower end closed by a cap or closure 69 which is seated in a recess 71 in the threaded end 18 of the ball 17. A pressure cylinder 67 is positioned within the reserve tube 65 and has a valve assembly 73 fitted in and closing the lower end thereof, the valve assembly 73 being seated in the cap 69.

The upper end of hte reserve tube 65 has a cap 75 fitted therein and seated against a cap 61 welded to the tube 16. A seal assembly 77 is held in the cap 75 by a retaining ring 79 and engages the piston rod 15 to prevent the loss of fluid pressure therepast. The lower end of the cap 75 positions an annular piston rod guide 81 which surrounds and [guides] *acts as a guide means for the upper end of* the piston rod 15 [and has its lower end] , *the lower end of the guide 81 being* fitted in the upper end of the pressure tube 67. An absorbent and resilient annular sleeve 83 held in the rod guide 81 by a snap ring 84 engages the piston rod 15 and prevents it from becoming scored during movement relative to the guide 81.

A piston 85 is retained on a reduced and threaded lower end 89 of the piston rod 15 by a nut 87 and has a piston ring 88 engaging the wall of the pressure cylinder 67 to prevent the flow of fluid therepast. The piston 85 *along with the interior of the cylinder 67 within which it is slidably disposed, acts as a guide means for the lower end of the piston rod 15. The piston 85* is provided with an inner set of circumferentially spaced passages 91 and an outer set of circumferentially spaced passages 93 and has a central aperture 95 through which the reduced and threaded lower end 89 of the piston rod 15 extends (FIG. 2). The upper ends of the passages 93 are closed by a disc 97 yieldably held in engagement with a valve seat 98 on the top of the piston 85 by a finger-type spring 99. A support washer 101 has an annular flange 103 engaging and holding the inner peripheral portion of the spring 99 against the piston 85. The washer 101, in turn, is disposed between the top of the piston 85 and a radial shoulder 105 on the piston rod 15. The washer 101 also has one or more apertures 106 which communicate with apertures 108 in the disc 97 and with the upper ends of the inner passages 91. The lower ends of the inner passages 91 are closed by a valve disc 107 yieldably held in engagement with a valve seat 109 on the lower surface of the piston 85 by a cage 111 against which one end of a compression spring 113 acts, the other end of the compression spring engaging a flange 115 on the nut 87.

The valve assembly 73 at the lower end of the pressure tube 67 is shown in greater detail in FIG. 3 and includes a valve body 117 having grooves 119 in its underside which communicate the space beneath the valve body 117 with the space between the pressure cylinder 67 and the reserve tube 65, so that hydraulic fluid can flow from the pressure cylinder to the reserve tube and vice versa. The valve body 117 has an inner set of circumferentially spaced passages 121 and an outer set of circumferentially spaced passages 123 and a large central aperture 125. The upper ends of the passages 123 are closed by a valve disc 127 yieldably held in engagement with a valve seat 129 on the top surface of the valve body 117 by a fingertype spring 131. The inner circumference of the spring 131 and the valve disc 127 are held against the valve seat 129 by a head 133 formed on a nut or plug 135 extending through the aperture 125. The valve disc 127 has one or more apertures 134 which communicate with the upper ends of the aperture 121. The lower ends of the apertures 121 are closed by a valve disc 137, the inner circumferential portion of which is held in engagement with a valve seat 139 on the lower surface of the valve body 117 by a nut 141 threaded on the lower end of the plug 135.

In use, the vehicle body weight is supported by the wheels and is suspended at each wheel by the coil spring 26 as described above. When the vehicle body moves upwardly relative to the wheel causing the piston 85 to move upwardly relative to the cylinder assembly 13 on the rebound stroke, the pressure of the hydraulic fluid in the pressure cylinder 67 above the piston increases until the valve disc 107 moves away from the valve seat 109 and the fluid flows through the inner piston passages 91 into the lower portion of the pressure cylinder 67. The fluid pressure at which the valve disc 107 moves away from the seat 109 is a function of the stiffness of the spring 113 and that of the disc 107. Because the piston rod 15 occupies a portion of the pressure cylinder 67 above the piston 85, it is necessary that the lower portion of the pressure cylinder be replenished with fluid during the rebound stroke. This is achieved by the flow of liquid from the reserve tube 65 through the apertures 119 in the valve body 117 and upwardly through the outer passages 123. As the valve plate 127 is held on its seat only by the light spring 131, the differential pressure on opposite sides of the valve plate 127 is sufficient to move the valve plate away from its seat 129 so that the pressure cylinder remains filled with fluid. Upward movement of the piston rod 15 is limited and cushioned by a resilient annular sleeve 143 engageable with the lower end of the guide 81 and held in place on the piston rod 15 by a collar 145. The sleeve 143 has one or more radial slots 146 at its upper end and the sleeve 143 and collar 145 are spaced from the wall of the pressure cylinder 67 permitting fluid within the pressure cylinder to maintain the absorbent sleeve 83 saturated.

When the piston 85 moves downwardly in the pressure cylinder 67 on the compression stroke, fluid in the pressure cylinder below the piston flows upwardly through the outer piston passages 93 when sufficient pressure has been built up below the piston 85 to overcome the force of the spring 99 and move the valve disc 97 away from its seat 108. The pressure cylinder 67 above the piston 85 cannot accommodate all of the fluid displaced from the lower portion of the pressure cylinder because of the presence of the piston rod 15. Therefore, as the piston 85 moves downwardly in the pressure cylinder 67, fluid pressure builds up below the piston 85 and moves the valve disc 137 away from the valve seat 139 by flexing the disc thereby allowing fluid to flow from the lower portion of the pressure cylinder 67 through the apertures 119 in the valve body 117 and out to the reserve cylinder 65. One or more passageways 148 in the piston rod guide 81 permit fluid in the reserve cylinder 65 to maintain the top of the absorbent sleeve 83 saturated. Downward travel of the piston rod 15 is cushioned and limited by a resilient sleeve 150 fixed to the piston rod 15 and engageable with the top of the cap 61. A skirt 152 is seated against the spring support 30 and surrounds the sleeve 150 and the top of the tube 16 to prevent dirt, grease and other foreign matter from getting on the piston rod 15.

The resistance of the suspension device to compression and rebound movement is established by the size of the passageways and the stiffness of the valve discs and the loading springs so as to attain the desired operating conditions and provide smooth and comfortable riding qualities.

As described above, a major problem which has existed in suspension systems of this type has been that when the shock absorber components become worn and require replacement, a major portion the vehicle front end and steering controls had to be dismantled. This was so because in these prior systems, the cylinder assembly 13 was connected directly to the spindle 19 and to the ball 17 of the ball socket joint. This problem has been eliminated by the present invention by providing the tube 16 which here is secured to the spindle 19 and to the ball 17 as illustrated and described making the entire shock-absorber assembly easily removable. Thus, when the shock-absorber components, including the piston 85, the pressure cylinder 67 and the valves become worn and require replacing, it is only necessary to remove the nut 35 from the upper reduced end 33 of the piston rod 15 after snapping the plate 49 out of the sleeve 47 and to unscrew the ball member 17 from within the tube 16 after removing the pin 24. The entire shock-absorber assembly including the reserve tube 65, the pressure tube 67 and the piston rod 15 can then be slid out of the tube 16 through its lower end. During this time, the bearing 29 and the washer 39 hold the spring support 30 in place so that the spring 26 remains intact. Thereafter, a new shock-absorber assembly is inserted, the ball member 17 threaded into the lower end of the tube 16 and the nut 35 threaded on the upper reduced end 33 of the new piston rod 15. In this way, the old shock absorber is quickly and easily removed and replaced with a new one without requiring costly, difficult and time-consuming dismantling of the vehicle front end or steering controls.

Thus, by the present invention there has been provided an improved suspension device having an easily replaceable shock-absorber assembly constructed to fulfill the objects hereinabove set forth, and while a preferred embodiment has been illustrated and described above in detail, various additions, substitutions, modifications and omissions may be made thereto without departing from the spirit of the invention as encompassed by the appended claims.

What is claimed is:

1. In an independent wheel suspension device for an automotive vehicle, said suspension device comprising a hydraulic tubular shock absorber having a pair of relatively movable telescopic parts, detachable means on one of said telescopic parts connectable to a body portion of said vehicle, a tube removably supporting the other of said telescopic parts, said tube being connectable to a wheel spindle and having a removable end portion whereby said shock absorber is removable and replaceable through the end of said tube having said removable end portion upon detaching said detachable means.

2. In an independent wheel suspension device for an automotive vehicle, said suspension device comprising a hydraulic tubular shock absorber having a pair of relatively movable telescopic parts, detachable means on one of said telescopic parts connectable to a body portion of sadi vehicle, a tube removably supporting the other of said telescopic parts, said tube being connectable to a wheel spindle and having a threaded member forming a closure for one end thereof connectable to and supportable by a suspension arm, whereby said shock absorber is removable and replaceable through said one end upon detaching said detachable means and removing said threaded member.

3. In an independent wheel suspension device for an automotive vehicle, said suspension device comprising a hydraulic tubular shock absorber having a pair of relatively movable telescopic parts, detachable means on one of said telescopic parts connectable to a body portion of said vehicle, a tube removably supporting the other of said telescopic parts, a compression spring sleeved over said tube, said spring caged between a first support fixed to said tube and a second support supportable by said body portion, said tube being connectable to a wheel spindle and having a threaded member in one end thereof, universally supportable on a suspension arm, whereby said shock absorber is removable and replaceable upon detaching said detachable means and removing said threaded member.

4. In an independent wheel suspension device for an automotive vehicle, said suspension device comprising a hydraulic tubular shock absorber having a pair of relatively movable telescopic parts, detachable means on one of said telescopic parts connectable to a body portion of said vehicle, a tube connectable to a wheel spindle and removably receiving the other of said telescopic parts, said tube having a ball member threaded into its lower end, said ball member supporting the other of said telescopic parts and receivable in a socket connectable to a suspension arm whereby said shock absorber is removable and replaceable upon detaching said detachable means and removing said ball member from said tube lower end.

5. In an independent wheel suspension device for an automotive vehicle, said suspension device comprising a hydraulic tubular shock absorber having a piston rod and piston slidably disposed in a cylinder assembly, detachable means on said piston rod connectable to a body portion of said vehicle, said detachable means including a bearing supportable in said body portion and receiving a reduced end of said piston rod and a nut threaded on said reduced end, a tube connectable to a wheel spindle and removably receiving said cylinder assembly, said tube having a ball member threaded into its lower end, said ball member supporting said cylinder assembly and receivable in a socket connectable to a suspension arm whereby said shock absorber is removable and replaceable upon detaching said nut and removing said ball member from said tube lower end.

6. In an independent wheel suspension device for an automotive vehicle, said suspension device comprising a hydraulic tubular shock absorber having a piston rod and piston slidably disposed in a cylinder assembly, detachable means on said piston rod connectable to a body portion of said vehicle, said detachable means including a bearing resiliently supportable in said body portion and receivng a reduced end of said piston rod and a nut thread on said reduced end, a tube connectable to a wheel spindle and removably receiving said cylinder assembly, a compression spring sleeved over said tube, said spring caged between a first support fixed to said tube and a second support held between said bearing and a shoulder on said piston rod adjacent said reduced end, said tube having a ball member threaded into its lower end, said ball member supporting said cylinder assembly and receivable in a socket connectable to a suspension whereby said shock absorber is removable and replaceable upon detaching said nut and removing said ball member from said tube lower end.

7. In an independent wheel suspension device for an automotive vehicle, said suspension device comprising a hydraulic tubular shock absorber having a pair of relatively movable telescopic parts, detachable means on one of said telescopic parts connectable to a body portion of said vehicle, a tube mounted in and fixed to a sleeve connectable to a wheel spindle and removably receiving the other of said telescopic parts, said tube having a ball member threaded into its lower end, said ball member supporting the other of said telescopic parts and receivable in a socket connectable to a suspension arm whereby said shock absorber is removable and replaceable upon detaching said detachable means and removing said ball member from said tube lower end.

*8. In a MacPherson-type independent wheel suspension device for an automotive vehicle having sprung and unsprung portions,*

*said suspension device comprising a hydraulic tubular shock absorber having a pair of relatively movable telescopic parts,*

*detachable means on one of said telescopic parts connectable to a body portion of said vehicle,*

*a tube removably supporting the other of said telescopic parts,*

*said tube having a wheel spindle mounted thereon and having an opening in one end thereof through which said shock absorber is removable and replaceable, said tube being provided with a removable end member which when mounted on said tube retains said shock absorber therein, and when removed, permits removal of said shock absorber upon detaching said detachable means.*

*9. In a MacPherson-type independent wheel suspension device for an automotive vehicle having sprung and unsprung portions,*

*said suspension device comprising a hydraulic tubular shock absorber having a pair of relatively movable telescopic parts,*

*one of said parts comprising a cylinder and the other of said parts comprising a piston and piston rod reciprocably disposed in said cylinder, with said piston rod extending longitudinally from one end of said cylinder,*

*detachable means on said one telescopic part comprising said piston rod connectable to the sprung body portion of said vehicle,*

*a tube removably supporting said cylinder,*

*said tube being connectable to a wheel spindle and having a removable end portion wherein said shock absorber is removable and replaceable as a cartridge unit through the end of said tube having said removable end portion upon detaching said detachable means.*

*one of said parts comprising a cylinder and the other of said parts comprising a piston and piston rod reciprocably disposed in said cylinder, with said piston rod extending longitudinally from one end of said cylinder,*

*said piston rod being connected to said sprung portion of the vehicle,*

*detachable means on said one telescopic part comprising said piston rod connectable to the sprung body portion of said vehicle so as to provide for relative rotational movement between said piston rod and said sprung body portion,*

*a tube removably supporting said cylinder,*

*said tube having a wheel spindle fixedly secured adjacent the lower end thereof and having a removable end portion said shock absorber is removable and replaceable as a cartridge unit through the end of said tube having said removable end portion upon detaching said detachable means.*

*10. The invention as set forth in claim 9 wherein the longitudinal axis of said device defines a pivotal axis about which a wheel mounted on said spindle is pivotable during steering movement thereof, first and second guide means located at longitudinally spaced apart positions along said pivotal axis for guiding said first and second parts for longitudinal sliding movement.*

*11. The invention as set forth in claim 10 wherein said first and second guide means comprise said piston and cylinder, and said piston rod and a rod guide assembly located adjacent the upper end of said cylinder.*

12. The invention as set forth in claim 9 which includes a coil spring extending around the upper end of said device and supported at one end by a first spring support located on said tube and at the opposite end thereof by a second spring support located adjacent the connection of said piston rod with said sprung vehicle portion.

13. The invention as set forth in claim 9 wherein the longitudinal axis of said device defines a pivotal axis about which a wheel mounted on said spindle is pivotable during steering movement thereof, first and second guide means located at longitudinally spaced apart positions along said pivotal axis for guiding said first and second parts for longitudinal sliding movement, and a coil spring extending around said device and supported at one end by a first spring support located on said tube and at the opposite end thereof by a second spring support located adjacent the connection of said piston rod with said sprung vehicle portion.

*14. The invention as set forth in claim 13 wherein said coil spring is arranged coaxially of said suspension strut.*

*15. The invention as set forth in claim 9 wherein said piston rod is rotatably connected to said sprung vehicle portion.*

*16. In a MacPherson-type independent wheel suspension device for an automotive vehicle having sprung and unsprung portions,*

*said suspension device comprising a hydraulic tubular shock absorber having a pair of relatively movable telescopic parts,*

*one of said parts comprising a cylinder and the other of said parts comprising a piston and piston rod reciprocably disposed in said cylinder, with said piston rod extending longitudinally from one end of said cylinder,*

*said piston rod being directly connected to said sprung portion of the vehicle,*

*detachable means on said one telescopic part comprising said piston rod connectable to the sprung body portion of said vehicle,*

*the longitudinal axis of said device defining a pivotal axis about which a wheel mounted on a wheel spindle is pivotable during steering movement thereof, first and second guide means located at longitudinally spaced apart positions along said pivotal axis for guiding said first and second parts for longitudinal sliding movement,*

*a tube removably supporting said cylinder,*

*said tube being connectable to a wheel spindle and having a removable end portion wherein said shock absorber is removable and replaceable as a cartridge unit*

*through the end of said tube having said removable end portion upon detaching said detachable means.*

*17. In a MacPherson-type independent wheel suspension device for an automotive vehicle having sprung and unsprung portions,*

*said suspension device comprising a hydraulic tubular shock absorber having a pair of relatively movable telescopic parts,*

*one of said parts comprising a cylinder and the other of said parts comprising a piston and piston rod reciprocably disposed in said cylinder, with said piston rod extending longitudinally from one end of said cylinder,*

*said piston rod being connected to said sprung portion of the vehicle,*

*detachable means on said one telescopic part comprising said piston rod connectable to the sprung body portion of said vehicle,*

*a tube removably supporting said cylinder,*

*a coil spring extending around said device and supported at one end by a first spring support located on said tube and at the opposite end thereof by a second spring support located adjacent the connection of said piston rod with said sprung vehicle portion,*

*said tube being connectable to a wheel spindle and having a removable end portion wherein said shock absorber is removable and replaceable as a cartridge unit through the end of said tube having said removable end portion upon detaching said detachable means.*

*18. The invention as set forth in claim 17 wherein said first and second guide means comprise said piston and cylinder, and said piston rod and a rod guide assembly located adjacent the upper end of said cylinder.*

*19. In a MacPherson-type independent wheel suspension device for an automotive vehicle having sprung and unsprung portions,*

*said suspension device comprising a hydraulic tubular shock absorber having a pair of relatively movable telescopic parts,*

*one of said parts comprising a cylinder and the other of said parts comprising a piston and piston rod reciprocably disposed in said cylinder, with said piston rod extending longitudinally from one end of said cylinder,*

*said piston rod being connected to said sprung portion of the vehicle,*

*detachable means on said one telescopic part comprising said piston rod connectable to the sprung body portion of said vehicle so as to provide for relative rotational movement between said piston rod and said sprung body portion,*

*a tube removably supporting said cylinder,*

*said tube having a wheel spindle fixedly secured adjacent the lower end thereof and having a removable end portion wherein said shock absorber is removable and replaceable as a cartridge unit through the end of said tube having said removable end portion upon detaching said detachable means.*

*20. The invention as set forth in claim 19 wherein said coil spring is arranged coaxially of said suspension strut.*

*21. The invention as set forth in claim 9 wherein said tube has said wheel spindle fixedly secured thereto at the lower end thereof.*

*22. The invention as set forth in claim 21 which includes a coil spring extending around said device and supported at one end by a first spring support located on said tube and at the opposite end thereof by a second spring support located adjacent the connection of said piston rod with said sprung vehicle portion.*

*23. The invention as set forth in claim 21 wherein said piston rod is rotatably connected to said sprung vehicle portion.*

*24. The invention as set forth in claim 21 wherein said tube has said wheel spindle fixedly secured thereto at the lower end thereof.*

*25. The invention as set forth in claim 17 wherein said tube has said wheel spindle fixedly secured thereto at the lower end thereof.*

*26. The invention as set forth in claim 25 wherein said first and second guide means comprise said piston and cylinder, and said piston rod and a rod guide assembly located adjacent the upper end of said cylinder.*

*27. The invention as set forth in claim 9 wherein the longitudinal axis of said device defines a pivotal axis about which a wheel mounted on said spindle is pivotable during steering movement thereof, first and second guide means located at longitudinally spaced apart positions along said pivotal axis for guiding said first and second parts for longitudinal sliding movement, and wherein said tube has said wheel spindle fixedly secured thereto at the lower end thereof.*

*28. The invention as set forth in claim 27 wherein said coil spring is arranged coaxially of said suspension strut.*

*29. The invention as set forth in claim 27 wherein said piston rod is rotatably connected to said sprung vehicle portion.*

*30. The invention as set forth in claim 16 wherein said tube has said wheel spindle fixedly secured thereto at the lower end thereof.*

*31. The invention as set forth in claim 9 which includes a coil spring extending around said device and supported at one end by a first spring support located on said tube and at the opposite end thereof by a second spring support located adjacent the connection of said piston rod with said sprung vehicle portion and wherein said tube has said wheel spindle fixedly secured thereto at the lower end thereof.*

*32. In a MacPherson-type independent wheel suspension device for an automotive vehicle having sprung and unsprung portions,*

*said suspension device comprising a hydraulic tubular shock absorber having a pair of relatively movable telescopic parts,*

*one of said parts comprising a cylinder and the other of said parts comprising a piston and piston rod reciprocably disposed in said cylinder, with said piston rod extending longitudinally from one end of said cylinder,*

*said piston rod being connected to said sprung portion of the vehicle,*

*detachable means on said one telescopic part comprising said piston rod connectable to the sprung body portion of said vehicle so as to provide for relative rotational movement between said piston rod and said sprung body portion,*

*a tube removably supporting said cylinder,*

*said tube having a wheel spindle fixedly secured adjacent the lower end thereof and having a removable end portion wherein said shock absorber is removable and replaceable as a cartridge unit through the end of said tube having said removable end portion upon detaching said detachable means,*

*the longitudinal axis of said device defining a pivotal axis about which a wheel mounted on said spindle is pivotable during steering movement thereof, first and second guide means located at longitudinally spaced*

*apart positions along said pivotal axis for guiding said first and second parts for longitudinal sliding movement, and*

*a coil spring extending substantially coaxially around the upper end of said device and supported at one end by a first spring support located on said tube and at the opposite end thereof by a second spring support located adjacent the connection of said piston rod with said sprung vehicle portion.*

*33. The invention as set forth in claim 32 wherein said coil spring is arranged coaxially of said suspension strut.*

*34. The invention as set forth in claim 32 wherein said first and second guide means comprise said piston and cylinder, and said piston rod and a rod guide assembly located adjacent the upper end of said cylinder.*

*35. The invention as set forth in claim 32 wherein said removable end portion is threadably connected to said tube and selectively removable therefrom to permit said removal and replacement of said cartridge unit.*

*36. In a MacPherson-type independent wheel suspension device for an automotive vehicle having sprung and unsprung portions,*

*said suspension device comprising a hydraulic tubular shock absorber having a pair of relatively movable telescopic parts,*

*detachable means on one of said telescopic parts connectable to a body portion of said vehicle and providing for relative rotational movement therebetween,*

*a tube removably supporting the other of said telescopic parts,*

*said tube having a wheel spindle mounted thereon and a removable end member at one end thereof which when mounted on said tube retains said shock absorber therein, and when removed, permits removal of said shock absorber through said one end of said tube upon detaching said detachable means.*

*37. The invention as set forth in claim 36 wherein said removable end member is threadably connected to said tube.*

*38. The invention as set forth in claim 36 wherein said removable end member is located at the lower end of said tube.*

* * * * *

UNITED STATES PATENT AND TRADEMARK OFFICE

CERTIFICATE OF CORRECTION

PATENT NO. : RE 31,212

DATED : February 7, 1984

INVENTOR(S) : Charles J. Smith

It is certified that error appears in the above-identified patent and that said Letters Patent is hereby corrected as shown below:

Column 2, line 18, delete "the"

Beginning Column 7, line 56, delete up to and including Column 8, line 6

Signed and Sealed this

*Twelfth* Day of *March 1985*

[SEAL]

*Attest:*

DONALD J. QUIGG

*Attesting Officer* *Acting Commissioner of Patents and Trademarks*